United States Patent
Kitajima

(10) Patent No.: US 7,528,869 B2
(45) Date of Patent: May 5, 2009

(54) IMAGING APPARATUS FOR RECORDING AND REPLAYING DATA

(75) Inventor: Tatsutoshi Kitajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 834 days.

(21) Appl. No.: 10/801,816

(22) Filed: Mar. 17, 2004

(65) Prior Publication Data

US 2005/0007464 A1 Jan. 13, 2005

(30) Foreign Application Priority Data

Mar. 17, 2003 (JP) ............................. 2003-072736
Feb. 27, 2004 (JP) ............................. 2004-055455

(51) Int. Cl.
*H04N 5/76* (2006.01)
(52) U.S. Cl. .................. 348/231.99; 348/231.2
(58) Field of Classification Search ............. 348/231.2, 348/231.3, 231.6, 231.9
See application file for complete search history.

(56) References Cited

U.S. PATENT DOCUMENTS

| | | | |
|---|---|---|---|
| 5,109,249 A | 4/1992 | Kitajima | |
| 5,229,805 A | 7/1993 | Kitajima | |
| 5,535,011 A * | 7/1996 | Yamagami et al. | 386/117 |
| 5,682,563 A | 10/1997 | Shinohara et al. | |
| 5,719,987 A * | 2/1998 | Kawamura et al. | 386/120 |
| 5,748,233 A | 5/1998 | Kitajima et al. | |
| 5,808,681 A | 9/1998 | Kitajima | |
| 5,937,100 A | 8/1999 | Kitajima | |
| 6,075,562 A | 6/2000 | Sakaguchi et al. | |
| 7,257,317 B2 * | 8/2007 | Ohnishi | 386/120 |
| 7,295,767 B2 * | 11/2007 | Takahashi et al. | 386/117 |
| 2003/0011687 A1 * | 1/2003 | Imura et al. | 348/231.2 |

FOREIGN PATENT DOCUMENTS

| | | |
|---|---|---|
| JP | 9-238303 | 9/1997 |
| JP | 11-136623 | 5/1999 |

(Continued)

OTHER PUBLICATIONS

U.S. Appl. No. 09/879,041, filed Jun. 13, 2001, Kitajima et al.

(Continued)

*Primary Examiner*—David L Ometz
*Assistant Examiner*—Luong T Nguyen
(74) *Attorney, Agent, or Firm*—Oblon, Spivak, McClelland, Maier & Neustadt, P.C.

(57) ABSTRACT

An imaging apparatus including a recording function or replaying function for moving image data or voice data, other than a recording or replaying function for at least still image data, and a continuing mode for recording simultaneously or in a predetermined order a plurality of data of same kind or different kind in the still image data, moving image data or voice data, the plurality of data being associated and capable of recording or replaying, in accordance with the continuing mode, the continuing mode having a function in which an associated information for a first data using the continuing mode is maintained after recording of the first data and a third data to be newly recorded is associated with the first data, if the continuing mode is selected again, after a second data that the continuing mode is not used, is recorded.

10 Claims, 15 Drawing Sheets

FOREIGN PATENT DOCUMENTS

| | | |
|---|---|---|
| JP | 11-203783 | 7/1999 |
| JP | 2000-196983 | 7/2000 |
| JP | 2001-69454 | 3/2001 |
| JP | 2002-189757 | 7/2002 |

OTHER PUBLICATIONS

U.S. Appl. No. 10/087,955, filed Mar. 5, 2002, Kitajima.
U.S. Appl. No. 10/230,162, filed Aug. 29, 2002 Kitajima et al.
U.S. Appl. No. 10/801,816, filed Mar. 17, 2004, Kitajima.

* cited by examiner

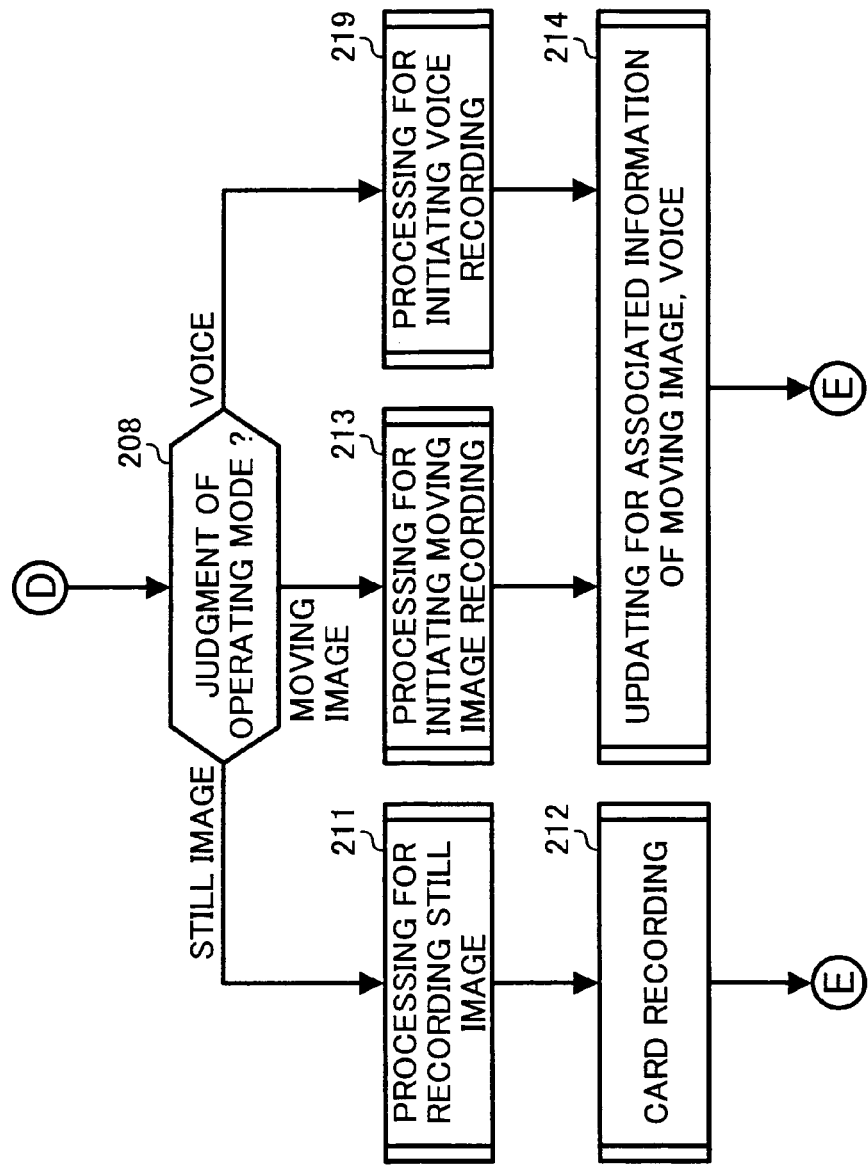

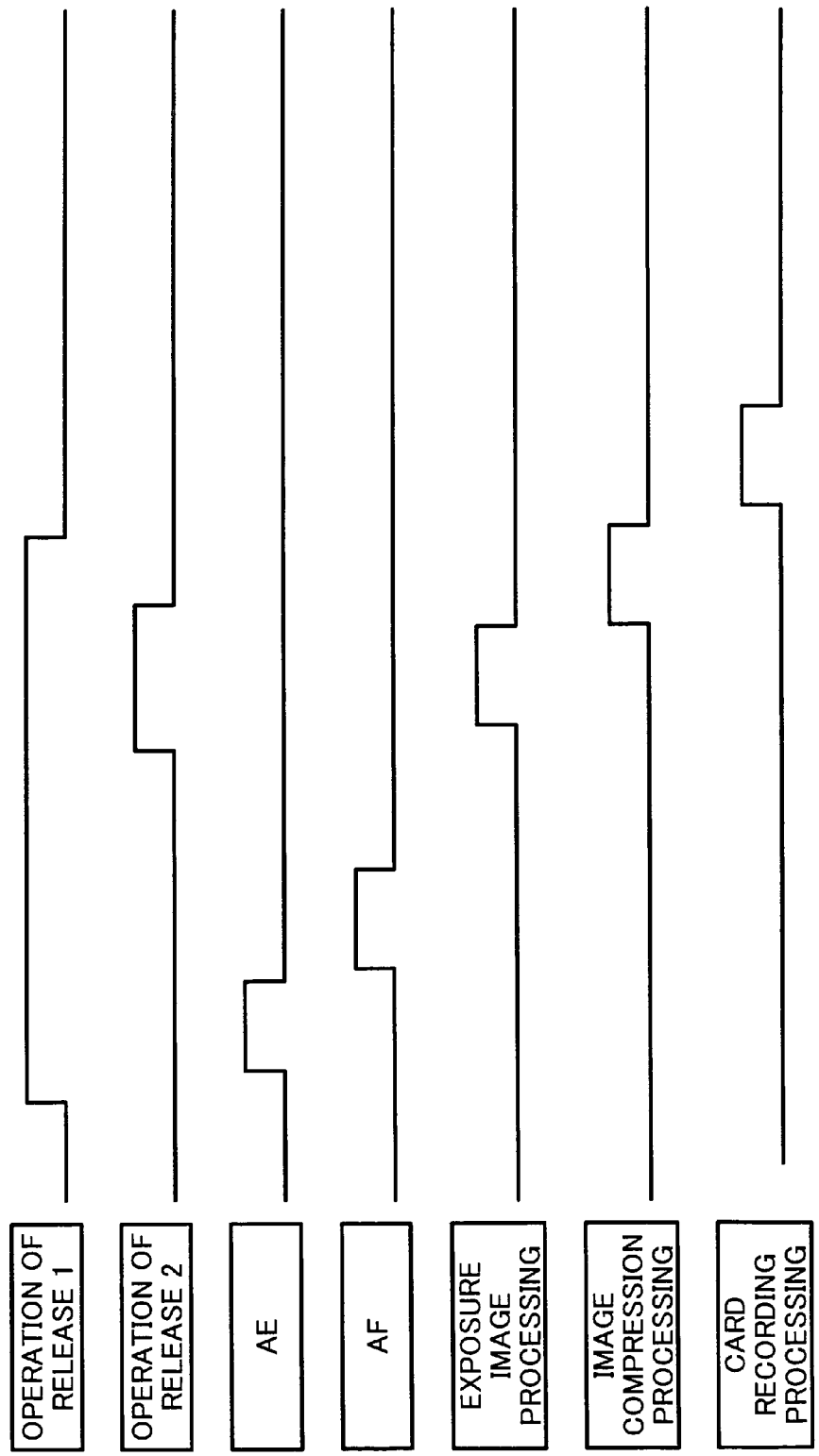

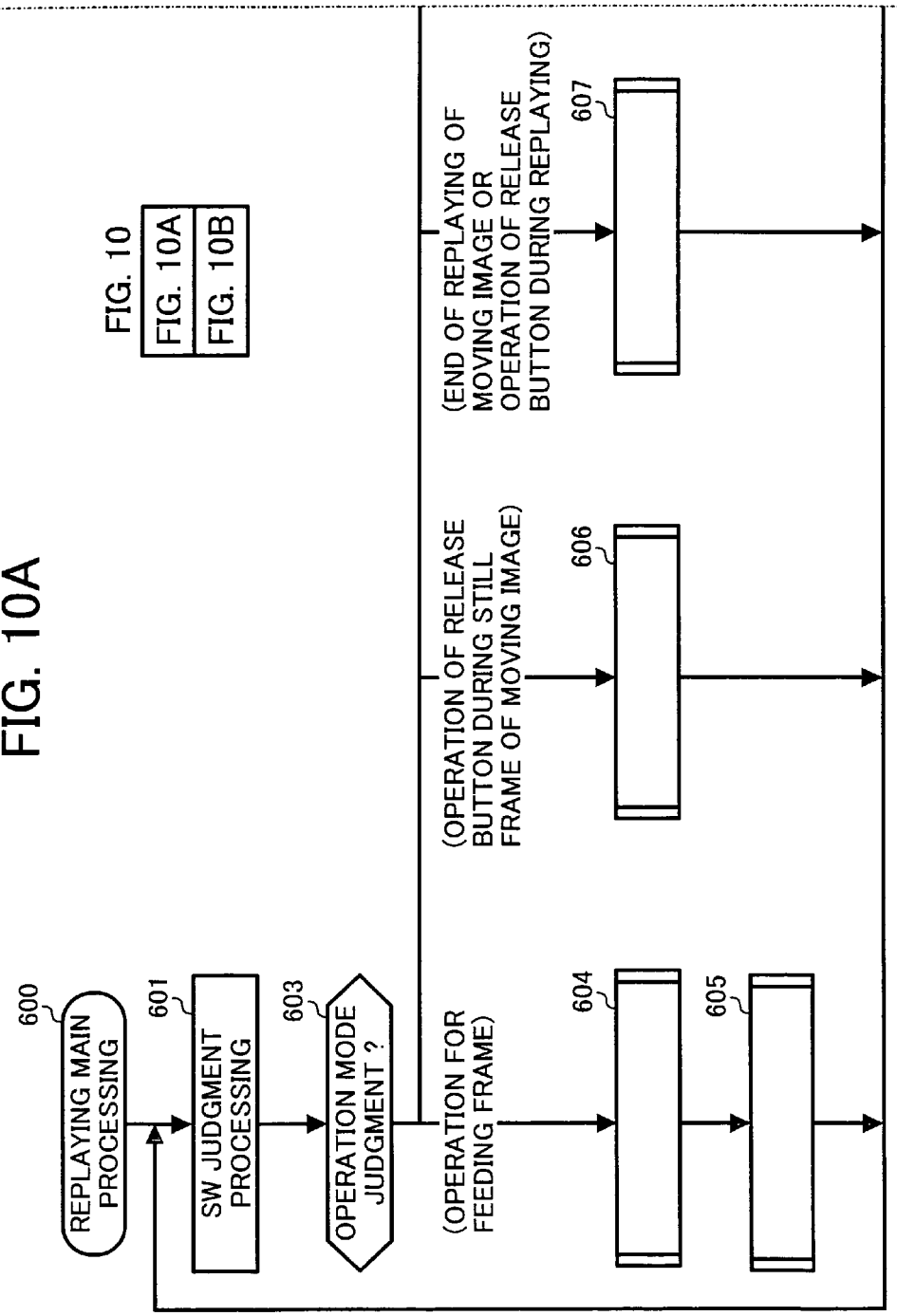

IMAGING APPARATUS FOR RECORDING AND REPLAYING DATA

BACKGROUND OF THE INVENTION

1. Field of the Invention

The present invention relates to an imaging apparatus or digital camera capable of recording and replaying still image data, moving image data and sound or voice data, particularly to a digital camera capable of terminating a record of a mother file to which a plurality of child files are connected, changing a photographic mode, holding an associated information and continuing an associated recording, even though a power source of the apparatus is turned off.

2. Description of the Related Prior Art

A recent digital camera has been adapted to be capable of recording and replaying moving image data and voice data in addition to still image data. Here, if these data can further be recorded by associating mutually, the benefit of the data is increased.

For example, if the still image data and the voice image data can be administrated as one group, it is possible to attach voice comments of a photographer on the still image. In the association between the data, a method for combining each data as one file and for associating with a number of a file name, even an individual file, is already commercialized.

As the method for associating by the number of the file name, for example, if the file name of an image is Image0003.jpg, there is a method in which different extensions are used so as to become the same file name so that the voice file name is Sound0003.wav.

In other words, if there is a voice file having the same file name to the file name of an image file when replaying the image, an automatic replaying of the voice is configured to carry out.

The above example corresponds to an association between single data, but for example, a method for associating voice data and still image data by recording the voice data continuously and inserting therebetween the photographed still image has also been proposed, for instance, as disclosed in Japanese Patent Laid-Open Publication H 11-203783. In the proposal, when replaying, the still image can also be displayed in turn in response to the voice replaying.

In addition, there are listed Japanese Patent Laid-Open publication Nos. H9-238303, H11-136623, 2000-196983, 2001-69454, and 2002-189757, as the other prior art.

Japanese Patent Laid-Open Publication H11-203783 also discloses an art for using a disc-shaped recording medium firstly, mounting a semi-conductor recording medium secondary, recording a voice information and an image information on the semi-conductor recording medium once, adding an administrated information of a recording time of the voice information to the voice information and recording it, adding a positional information in which a state of the voice at the time of recording the image information is recorded, to the image information and recording it, recording and administrating the voice and image information, arranging the voice and image information in order of recording when replaying and recording the arranged information on the semi-conductor recording medium, thereafter, replaying and displaying a first image information regardless of the positional information when the first image information is recorded simultaneously with the replaying of the voice information, and displaying the first image information until the other image information is replayed with a time schedule decided by the positional information.

Japanese Patent Laid-Open Publication H9-238303 discloses an art including photographic means for photographing a subject and outputting the photographed image data, image data cording means for cording the photographed image data and voice inputting means for converting a voice into an electrical signal, voice data cording means for cording the voice data converted into the electrical signal, and registering means. In the registering means, when the corded image data are recorded in recording means as an image file and the corded voice data are recorded in the recording means as a voice file, they are registered with file names including associated information for associating the image and voice files.

Japanese Patent Laid-Open Publication H11-136623 discloses a digital camera comprising a still image-recording mode with a voice for recording simultaneously still image data and voice data. The digital camera includes a CCD, an A/D converter and so on for photographing a subject and creating the image data, a microphone, a D/A converter and so on for converting a voice into an electrical signal to acquire voice data, a card memory for storing the image data as an image data file in a predetermined form and the voice data as a voice data file in a predetermined form, and a CPU for recording an associated information of the still image-recording mode with the voice on a portion of the image and voice data files, if the still image-recording mode with the voice is selected.

Japanese Patent Laid-Open Publication 2000-196983 discloses an art comprising a photoelectric conversion element, an image data conversion part for converting a signal from the photoelectric conversion element into image data, a storing part for storing the image data from the image data conversion part and data of a file name (name of a file and serial number), an image reproduction part for reconstructing the image data from the storing part, a displaying part for displaying an image and so on reconstructed in the image reproduction part, a control part for controlling the photoelectric conversion element and the aforementioned parts, and inputting means (character key, conversion key and input key) for inputting the file name and for giving instructions regarding the data of the file name to the control part. The control part has a program memory storing a program having a less labor hour when inputting data relating to a new file name and a CPU for carrying out a control by the program.

Japanese patent Laid-Open Publication 2001-69454 discloses an art for acquiring a photographic information and converting the information into image data, for taking out a fixed file name pre-stored in a digital camera and searching a memory card, for converting an additional information written in the fixed file into image data, thereafter, for extracting a Y component of a photographic image, for digital water-marking a photographic information formed into the image data and combining it to the Y component, further for digital water-marking an additional information formed into image data and combining it to the Y component to substitute it for the Y component of the photographic image.

Japanese Patent Laid-Open Publication 2002-189757 discloses a data searching device for data-searching object data to be searched and configured to include still image data and meta data with respect to a registered data base. In the data searching, the search for the searched object data is carried out based on a set searching condition and meta data included in each searching object data registered in the data base, and in a listed display of thumbnail of the searching object data prepared by execution of the searching, if there is registration of the searching object data having no existence, it is deleted, if the object data are not registered in the data base and if there are searching object data stored in a predetermined logic area, it is registered in the data base.

However, in the system for association in the prior art, a plurality of child files can be connected with one parent file, but if the recording of the parent file is terminated, the photographic mode is changed and a power source of the apparatus is turned off, because the file name of the parent file is deleted from a RAM, there is a problem that an associated information to data photographed next is missing and therefore the association information can be continued.

SUMMARY OF THE INVENTION

It is an object of the present invention to provide a digital camera capable of setting a file to a parent file, recording and holding an associated information for associating a file corresponding to a child with respect to the parent file, with a child file and continuing the associate recording, even if the recording of the parent file to which a plurality of child files are connected is terminated, a photographic mode is changed, and a power source of an apparatus is turned off.

To attain the above object, an imaging apparatus according to the present invention comprises: a recording function or replaying function for moving image data or voice data, other than a recording function or replaying function for at least still image data; and a continuing mode for recording simultaneously or in a predetermined order a plurality of data of same kind or different kind in the still image data, the moving image data or the voice data, the plurality of data being associated and capable of being recorded or replayed, in accordance with said continuing mode.

The continuing mode has a function in which an associated information for a first data using the continuing mode is maintained after recording of the first data and a third data to be newly recorded is associated with the first data, if the continuing mode is selected again, after a second data that the continuing mode is not used, is recorded.

According to the imaging apparatus, after the data is recorded by the continuing mode, the continuing mode is changed to a non-continuing mode and even if the non-continuing mode is returned to the continuing mode again, the third data can be associated with the first data, if the non-continuing mode is changed to the continuing mode again, because the associated information is held.

Therefore, the photography can be carried out without resetting the association with the previous data at each time.

Consequently, for example, if data regarding an object, a person or the like are arranged by associating a various of voice data or the other still image data with the still image data regarding the object, the person, an image, a voice or the like, an arrangement between data is very simple and the easy arrangement is very effective to a camera for coverage to be used conveniently.

BRIEF DESCRIPTION OF THE DRAWINGS

FIG. 5 B is a view showing a portion of a flow chart connected with the flow chart in FIG. 5 A.

FIG. 5 C is a view showing a portion of a flow chart connected with the flow chart in FIG. 5 B.

FIG. 5 D is a view showing a portion of a flow chart connected with the flow chart in FIG. 5 C.

FIG. 6 is a timing chart of a still image recording.

DETAILED DESCRIPTION OF THE PREFERRED EMBODIMENTS

Several embodiments of the present invention will be explained with reference to the accompanying drawings below.

Figure 1:
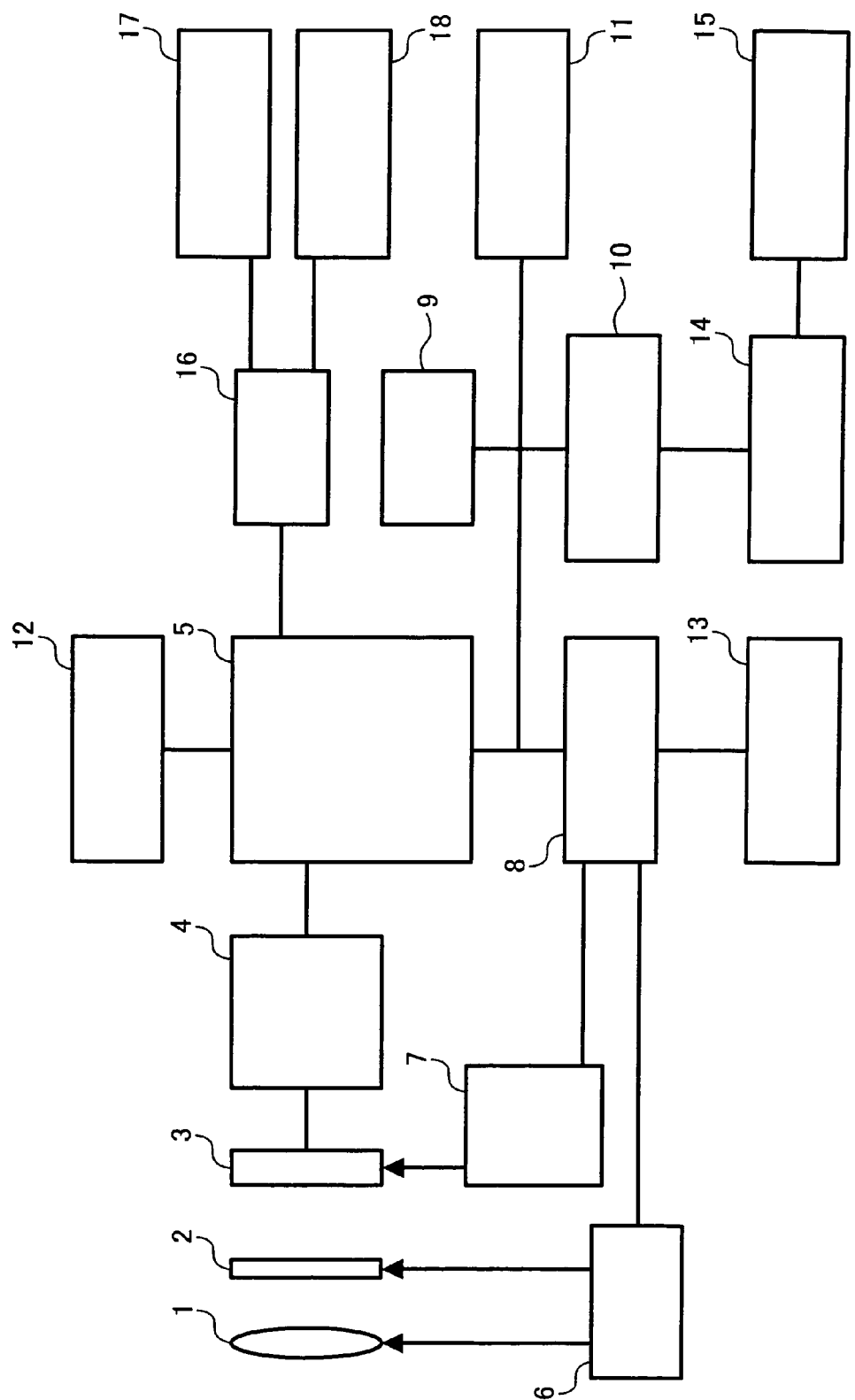
FIG. 1 is a structural view showing one embodiment of a digital camera according to the present invention.

FIG. 1 illustrates a structure of a digital camera embodying an imaging apparatus according to the present invention.

As shown in FIG. 1, the digital camera comprises a lens 1, a mechanical shutter 2, a CCD (charged coupled device), a CDS-AD part 4 for correlated double-sampling a signal from the CCD and converting the sampled signal into A/D, a DSP part 5 for converting the A/D conversion digital signal to a brightness Y, a color difference U and a V signal and for processing a digital signal to carry out a JPEG compression.

The digital camera also comprises a driver part 6 for driving a mechanical portion carrying out a focus drive for driving the lens 1 and opening and closing operations of the mechanical shutter 2, a CCD driving circuit part 7, a CPU 8 for controlling the camera as a whole, a memory 9 used as a work memory of the DSP part 5 and the CPU 8 in order to storage photographed image data and read data from a file for a period of time, a communication drive part 10 with an outside area of the camera, a memory card 11 attachable to and detachable form the camera, a display part 12 including a display controller for converting an outputting signal for a picture from the DSP part 5 into a signal capable of displaying on a LCD, which displays actually the picture.

The digital camera further comprises a SW part 13 comprising a various of switches that a user operates, a first outside device 14 (for example, a personal computer or the like) connected with the camera, a second outside device 15 (for example, a phone, a peripheral instrument such as a personal computer or the like) connected with the first outside device 14, a voice CODEC 16 for digital-converting a signal from an inputting analog part 17 and transmitting it to the DSP 5 and for analog-converting digital voice data received from the DSP part 5 and outputting it to an analog outputting part 18.

The CDS-AD part 4 is an analog-digital converter for a correlated double sampling signal, or an analog-digital converting part for a signal in which an image noise is cancelled by the correlated double sampling. The YUV data comprise brightness, color difference signals. The DSP means a digital signal processor. The LCD means a liquid crystal display, and the CODEC a code and decode device.

If a display device such as a monitor is connected as the first outside device 14, it is possible to display the image displayed on the display part 12 of a camera body as a more enlarged image and also to omit the display part 12. A charging circuit for charging a buttery in the camera body may also be built in the first outside device 14.

Next, an operation of the digital camera configured as described above will be explained with reference to FIGS. 2 to 11.

Figure 2:
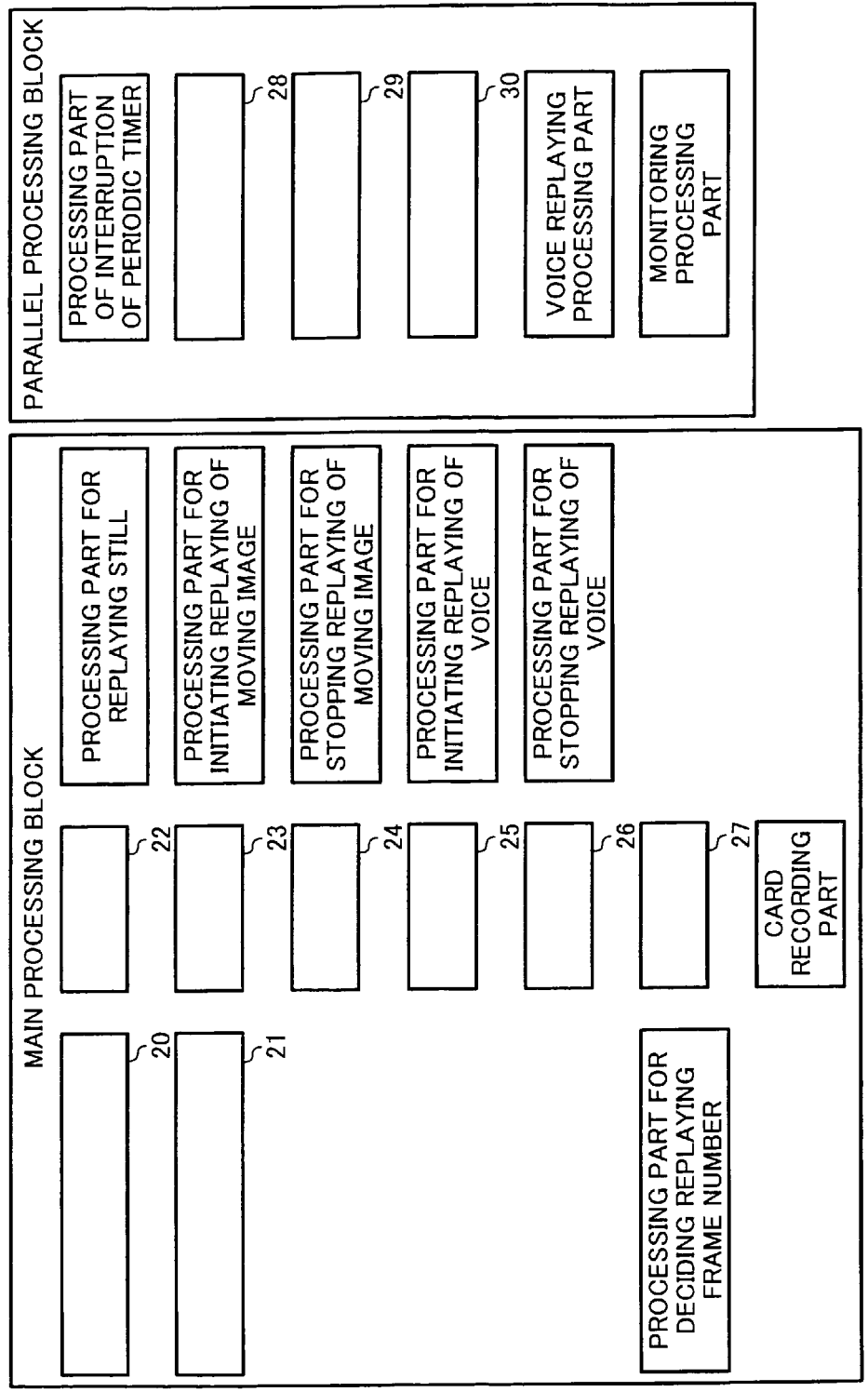
FIG. 2 is a functional block view of the digital camera shown in FIG. 1.
Figure 3:
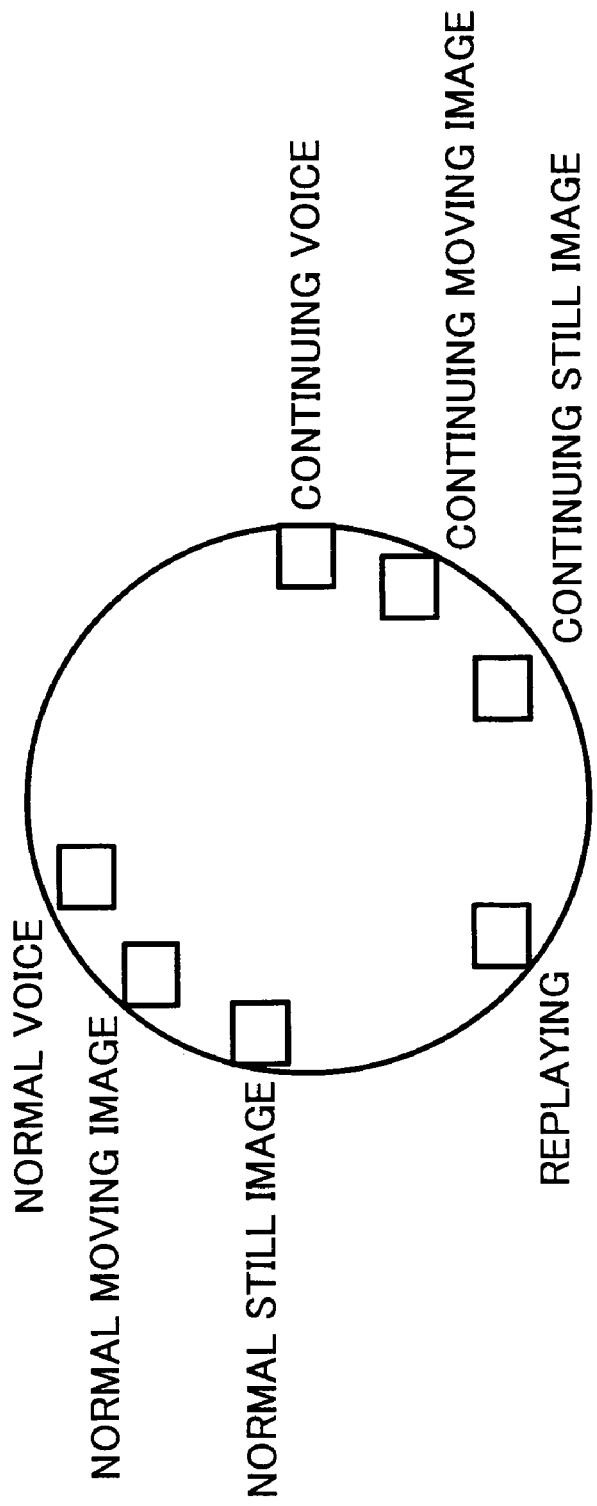
FIG. 3 is an explanatory view of dial selecting functional modes.
Figure 4:
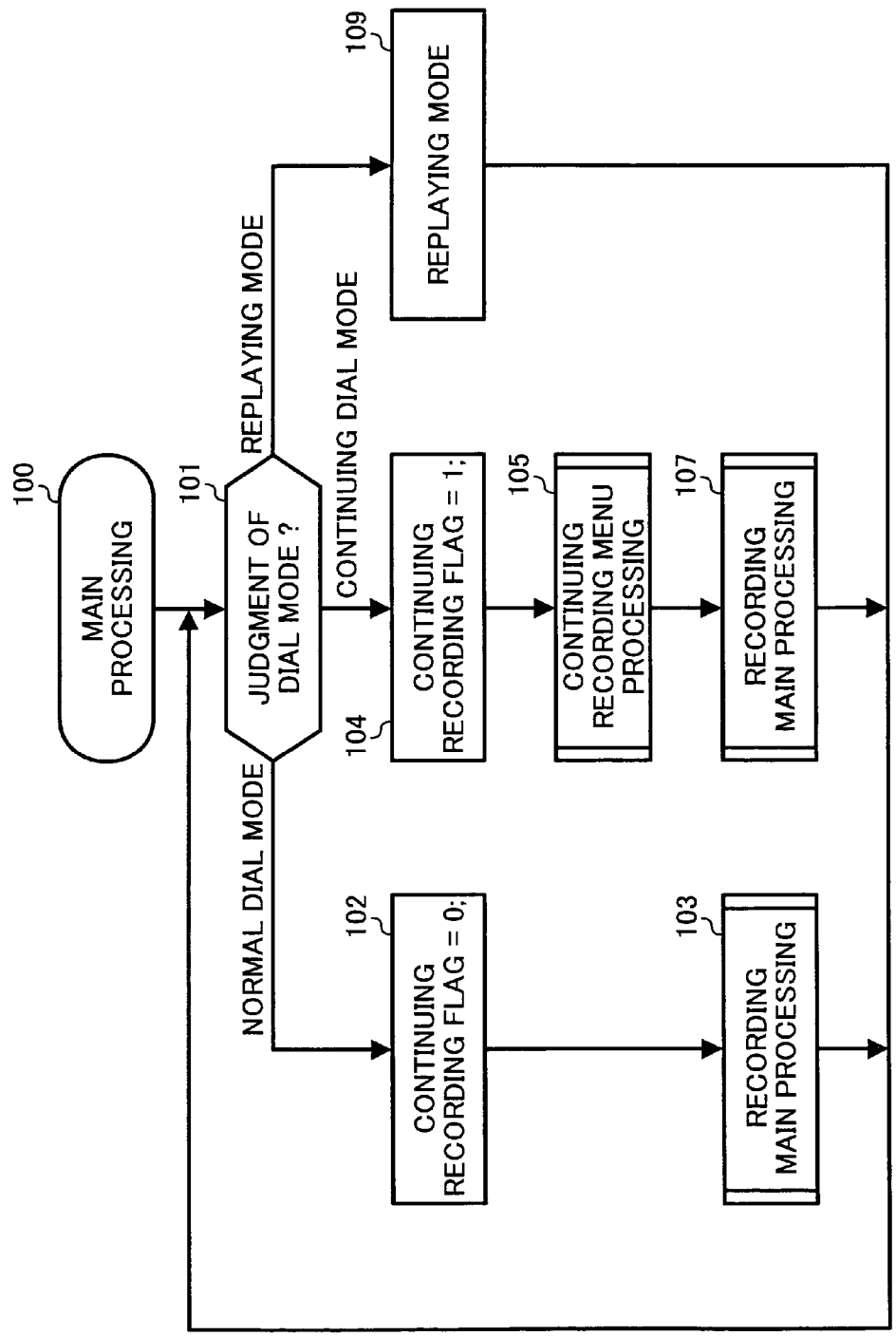
FIG. 4 is an operational flow chart of a processing for selection of the functional modes.

FIG. 2 is a functional block view of the digital camera sown in FIG. 1, FIG. 3 is an explanatory view of a dial switch, which is included in the SW part 13 and FIG. 4 is an operational flow chart in processes for selecting a functional mode. The SW part 13 is provided with a first switch (hereinafter, referred to as a first SW) for the shutter button, or a second switch (hereinafter, referred to as a second SW) for taking photography, and a power switch and the other switch, other than the dial switch.

The dial switch in the SW part 13 is first a circular dial disposed on a surface of the camera body, for example, and configured to rotate about a central axis disposed on a central portion thereof and to select the functional mode by stopping it at a position of a desired mode. A switch signal at a position where the dial switch stops has a function of determining a mode when photographing.

The dial switch in the SW part 13 is adapted to select a normal still image mode, a normal moving image mode, a normal voice mode, a continuing still image mode, a continuing moving image mode, a continuing voice mode and a replaying mode, as shown in FIG. 3.

In other words, the dial switch has a recording mode and the replaying mode. In the recording mode, there are a normal dial mode and a continuing dial mode. The normal dial mode includes the normal still image mode, the normal moving image mode, and the normal voice mode. The continuing mode includes the continuing still image mode, the continuing moving image mode, and the continuing voice mode. The normal dial mode is a mode in which an association of simultaneous replaying and an association of a sequence of the replaying are not carried out in a plurality of recorded data, in the recording mode of the still image, moving image and voice. The continuing dial mode is a mode in which the association of simultaneous replaying and the association of the replaying sequence are carried out in the plurality of recorded data, in the recording mode of the still image, moving image and voice.

The first SW and the second SW are provided on the shutter button. If the shutter button is pressed into a predetermined depth, the first SW is turned on, if the shutter button is further pressed, and then the second SW is turned on. The first SW is a switch for setting an auto-focus of the digital camera and the second SW is a switch for determining an operation of recording data actually.

FIG. 4 illustrates a step for a main processing for carrying out the photography by the camera and the play back. First, if the switch of a power source of the camera is turned on, a recording preparing processing of an initialization of a hard ware (not shown) in the camera, a formation of a file information in the card, in the memory 9 and so on is carried out, and thereafter the main processing is initiated.

The main processing as described corresponds to the entire processing including steps from a step 101 to a step 109. After the initiation of the main processing, judgment of a function that the dial switch in FIG. 3 is selected is carried out in the step 101. In the step 101, if the selected function of the dial switch is judged, a process of the selected function is carried out in accordance with a flow shown in FIG. 4.

Herein, a normal dial mode operation in the normal still image mode, normal moving image mode, and normal voice mode will, first, be explained.

That is to say, in the normal dial mode operation, a continuing recording flag is cleared (step 102), the recording main processing is carried out (step 103).

Figure 5A:
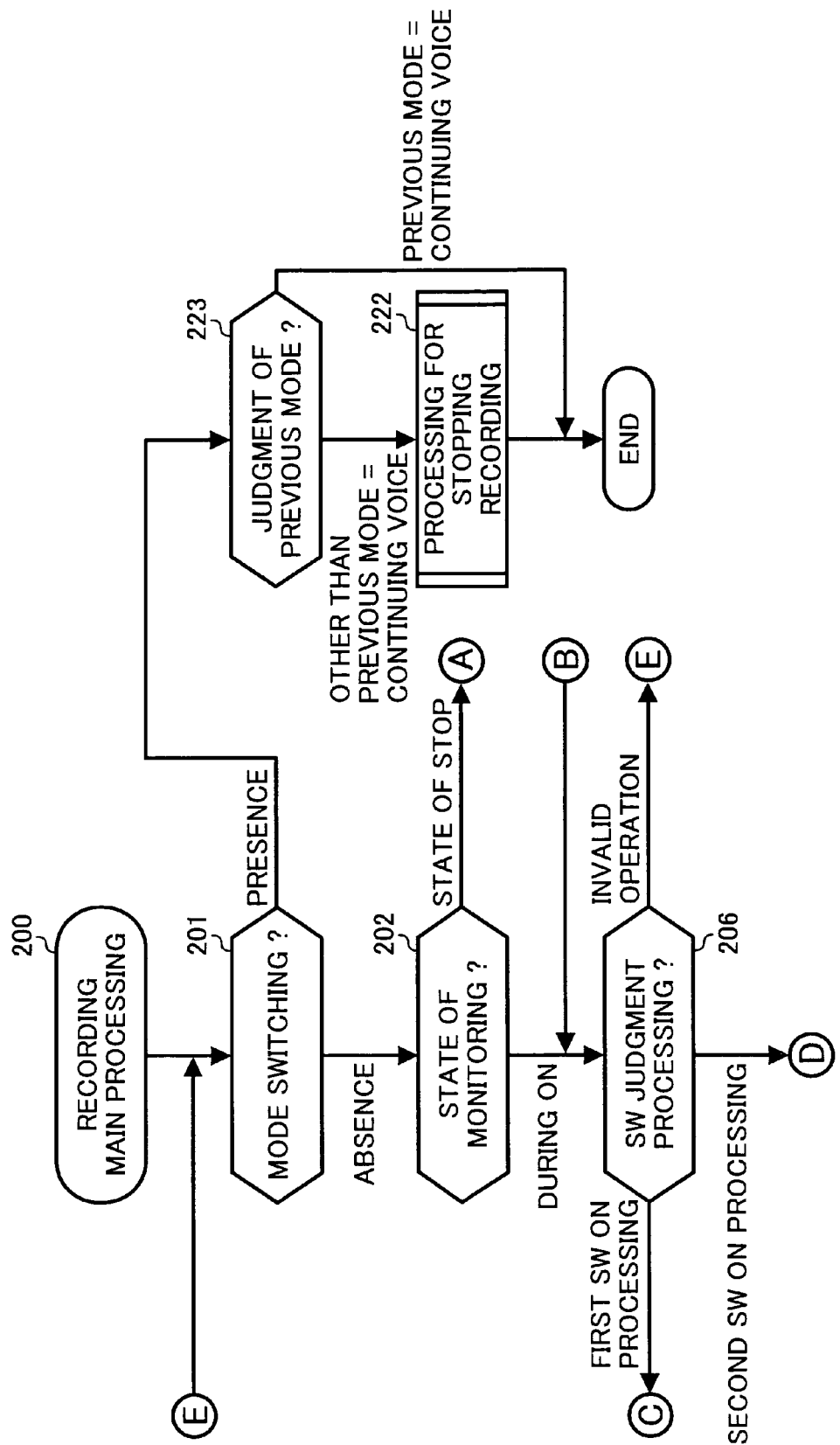
FIG. 5 A is a view showing a portion of a flow chart of a recording main processing shown in FIG. 4.
Figure 5B:
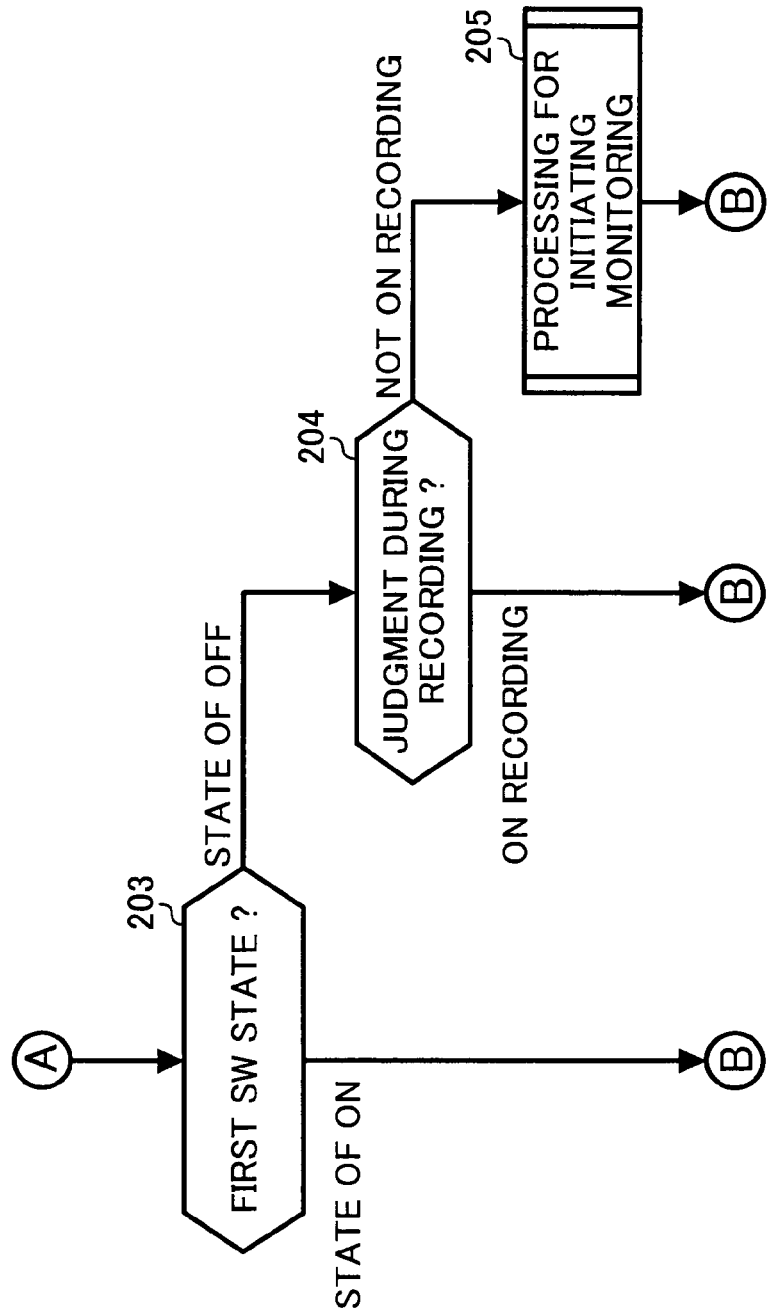
Figure 5C:
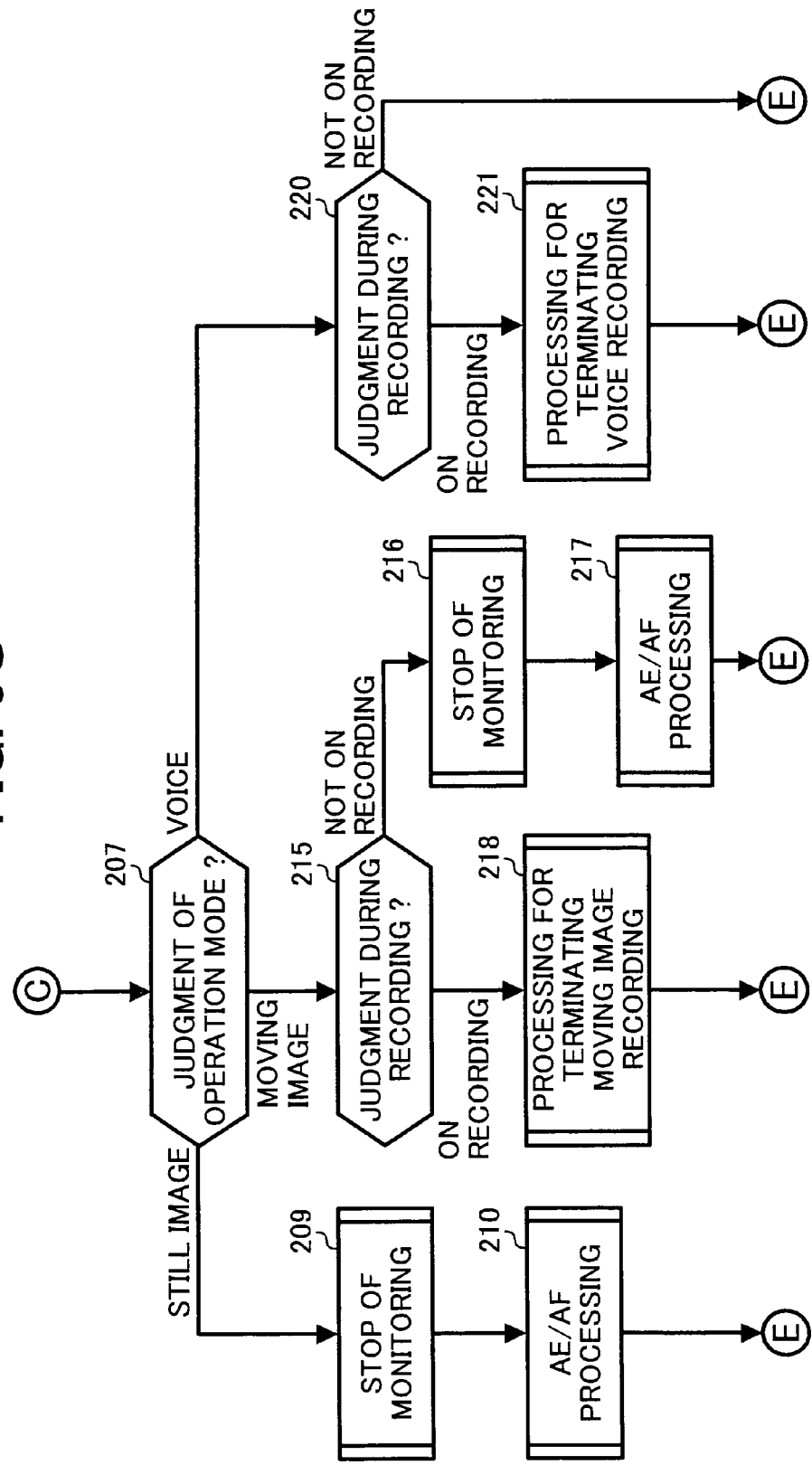

FIG. 5 illustrates a flow chart of the recording main processing (step 103) shown in FIG. 4. In the embodiment, the recording main processing is capable of recording the still image, moving image and voice.

In the recording main processing 200 in FIG. 5, whether or not the mode is switched is checked (step 201). In the checking for the mode switch, if it is absent, a monitoring state about whether or not the image is displayed on the display part 12 is checked (step 202). In the judgment of the mode switch in the step 201, if the mode switch is present, the presence and absence of the previous mode judgment is decided (step 223). In the step 223, if the previous mode is other than the continuing voice mode, the step is sifted to a step 222 and then a recording stop processing is carried out to complete the recording main processing 200. If the previous mode is the continuing voice mode in the step 223, the recording stop processing is not carried out in the step 222 and the recording main processing 200 is completed.

In the checking of the monitoring in the step 202, ON and OFF of the first SW for carrying out an AE-AF processing of the shutter button while stopping the monitoring are checked (step 203). In the checking, if the first SW is ON, the step is shifted to a SW judgment processing in a step 206.

If the first SW is OFF in the step 203, whether or not the memory card 11 is on recording is checked (step 204), if it is on recording, the step is shifted to the SW judgment processing in the step 206. In the checking in the step 204, if the memory card is not on recording, the step 204 is shifted to a step 205 and in the step 205, after a processing for initiating the monitoring is carried out, the step 205 is shifted to the SW judgment processing 206.

In the monitoring processing as described above, a trailing processing for AE (automatic exposure) and AWB (automatic white balance) is carried out in displaying a through image (image that an image captured by the CCD through lenses is displayed on the display part 12 of the camera) of the camera on the display part 12. By the monitoring processing, the image displayed on the display part 12 of the camera is maintained constantly into appropriate brightness and natural color.

The trailing processing for the AE and AWB means concretely carrying out a feed back control such as setting of an exposure time in the CCD drive circuit 7 and adjustment of a color parameter for a image processing in the DSP part 5 so that an evaluating value for each AE, AWB acquired by the CPU 8 through the digital image processing part from the data in the photographing part becomes a predetermined value.

The SW judgment processing part 20 (see FIG. 2) in the step 206 decides the SW information inputted by a periodic timer interrupting processing every 20 ms and thereafter outputs the decided SW information to a judgment part 21 for an operating mode. The judgment part 21 for the operating mode sorts a working into each processing block of an AE/AF (auto-focus) processing part 22 when photographing, a processing part 23 for recording the still image, a processing part 24 for initiating a recording of the moving image, a processing part 25 for terminating the recording of the moving image, a processing part 26 for initiating a recording of a voice and a processing part 27 for terminating the recording of the voice (steps 207 and 208).

In other words, there is provided on the SW part 13 in FIG. 1 the shutter button, which is configured into two steps of the first SW and the second SW.

If the still image is photographed, when the first SW is turned on by pressure of the shutter button, the monitoring is stopped (step 209), and then the AE/AF processing is carried out (step 210). Here, the CPU 8 is adapted to move the lens 1 by the driver part 6 to focus and to evaluate the photographic data by the DSP part 5 and to decide an exposure value of the CCD for being set in the CCD drive circuit part 7.

In the SW judgment processing in the step 206 as shown in FIG. 5, after the completion of the steps 209 and 210, the steps are returned again to the SW judgment processing in the step 206 through the processing in the steps 201 and 202. In the SW judgment processing in the step 206, if there is no effective SW information due to an invalid operation, a loop returning to the SW judgment processing in the step 206 through the steps 201 and 202 is repeated again.

In addition, in the SW judgment processing in the step 206, when the shutter button is pressed into the deepest part, if the second SW for deciding the photographic image is turned on, a judgment for an operational mode in the step 208 is carried out.

In the judgment for the operational mode in the step 208, when a processing for recording the still image is selected, the processing for recording the still image is carried out.

The recording processing the still image is carried out in steps 211 and 212. In the step 211, the recording processing is carried out, recording image data of the still image in the card is carried out in the step 212. In the recording processing for the still image in the step 211, the imaging data in the CCD are image-processed and compressed by the DSP 5 and then the processed and compressed data are written in the memory 9. In the step 12, the CPU 8, when the compressed data of the CCD imaging data are stored in the memory 9, writes the compressed data of the image in the memory card 11.

FIG. 6 illustrates a timing chart from the release operation to the card recording processing in the recording for the still image, in which a horizontal axis shows a time and a vertical axis shows a difference between ON and OFF. In the timing chart from the release operation to the card recording processing, a zone from the rising of the signal to the decaying of the signal shows ON and a long straight part shows OFF.

Subsequently, a recording of the moving image will be explained with reference to FIG. 2.

In FIG. 2, a main processing block and a parallel processing block for carrying out an actual recording operation are operated together or in parallel. When recording the moving image and voice, the main processing block controls an initiation and a completion of the actual recording operation with respect to a processing part 28 for recording the moving image and a processing part 29 for recording the voice in the parallel processing block. When the initiation, the main processing block actuates a processing for recording in the parallel processing block. When an operation of recording of the parallel processing block is initiated, the main processing block repeats the loop for the SW judgment processing in FIG. 5 as described above.

When the completion, the main processing block commands the end of recording processing of the parallel processing block and waits for receiving a notice of completion of the recording processing, from the parallel processing block.

In the recording operation, the DSP part 5 compresses, for example, fifteen images for one second and writes them in the memory 9. In parallel with that, because inputting data from the inputting analog part 17 including a microphone are digital-converted by the voice CODEC 16, the DSP part 5 also writes the digital voice data in the memory 9. The CPU 8 writes, for example, the moving image in the memory 9 during one second and the voice data in the memory card 11 as one package. In parallel with the working, the DSP part 5 writes moving image data for the next one second and voice data in another area in the memory 9.

If the first SW is turned on, during recording the moving image, the recording of the moving image is stopped, and then the CPU 8 writes the data in the memory 9 into the card 11, and simultaneously the moving image and voice data which are written until that moment are file-registered on an file-management information area in the card to complete the recording of the moving image file.

The processing for recording the moving image will be explained with reference to FIG. 5.

In case of processing the recording of the moving image, the dial switch selects a mode for processing the moving image. In the step 206, if the first SW is turned on, the SW judgment processing part 20 judges the ON of the first SW and further the moving image mode is judged in the mode judgment in the step 207. Because the step is not yet in the recording of the moving image, the AE/AF is processed (step 217), after the completion, the step is returned again to the SW judgment processing, until an effective SW information is inputted, the loop returning to the SW judgment processing is repeated without any operation.

In the step 206, when the second SW is turned on while the first SW is turned on, the SW judgment processing part 20 judges the ON of the second SW (step 208), after a recording processing of the moving image in a step 213 is carried out, a renewing processing for an associating information to associate moving data and voice data is carried out in a step 214. The main processing is returned to the SW judgment processing in the step 206, while, for this time, the moving image recording processing part 28 in the parallel processing block is executed together and a state of "on recording" is continued.

The first SW and second SW are not judged, as long as it is turned off, as the effective SW information in the SW judgment processing in the step 206. After the first SW and second SW are turned off once, if the first SW is turned on again, an ON processing of the first SW in the moving image mode is executed (step 215). When recording the moving image, in the judgment in the step 215 after the step 207, because the judgment of "on recording" is made, the processing of completion of the recording of the moving image is executed (step 218).

In the SW judgment processing in the step 206, if the invalid operation or until an effective SW information is inputted, without any operation, the loop returning to the SW judgment processing in the step 206 through the steps 201 and 202 is repeated again.

Next, the voice recording will be explained with reference to FIG. 1.

In case of the voice recording, the dial switch selects a voice recording mode. In this state, if the second SW is turned on, because the inputting data from the inputting analog part 17 including the microphone is digital-converted by the voice CODEC 16, the DSP 5 writes the converted voice data in the memory 9. The CPU 8 writes in turn the voice data in the card 11.

If the SW is turned on again during the voice recording, the processing is stopped and then the CPU 8 records as a file the voice data written until that moment on the file management information area in the card to thus complete the voice file recording.

Explaining the aforementioned voice recording processing in connection with FIG. 5, when the second SW is turned on, the ON processing of the second SW is judged (step 206) in the SW judgment processing, further the voice mod is judged (step 208) in the operational mode judgment and then the initiating processing for recording the voice is executed (step 219) in connection with the ON processing of the second SW. After the step 219, the main process returns to the SW judgment processing in the step 206 through the steps 201 and 202, while the voice recording processing in the parallel processing block in FIG. 2 is executed together and continues the state of "on recording".

As long as the first SW and second SW are turned off, they are not judged as the effective information in the SW judgment processing. After the first SW and the second SW are turned off once, if the SW is turned on again, the ON processing of the first SW in the voice mode is executed. In this case, because of "on recording", the voice recording completed processing is executed (steps 220 and 221).

In addition, if he dial mode is switched during operating, the switching of the dial mode is detected (step 201) by the aforementioned timer interrupting processing. In the step 201, it is judged that the switching of the mode is present, and a processing for stopping the recording is carried out in a step 222.

Next, if the associated information or name of file is held even through a mode other than the continuing recording mode and in case becoming the continuing mode again, a function capable of carrying out the associated recording function will be explained in accordance with the associated information.

In the embodiment, the file name corresponds to an associated information for associating each file.

Here, a timing of the replaying of the plurality of files can be decided adjustably by associating each file so that for example, the moving data file or the still image data file and the voice data file are simultaneously replayed, sets of the moving image data file or the still image data file and the voice data file are replayed in a predetermined order, a plurality of voice data files are replayed in a predetermined order, and a plurality of still image data files are replayed in a predetermined order.

Concretely, it is possible to edit to be capable of replaying simultaneously or in time sequence the voice data with the image data or image data a display or the like. The associated function is performed as follows.

That is to say, it is first assumed that the name of file of the still image is simg@@_.jpg, the name of file of the moving image is mimg@@_.avi, and the name of file of the voice is sud@@_.wav. Here, the @@ is parent number, and the  is child number. If the parent numbers @@ of files are the same, the files are deemed as mutually associated and the orders of the child numbers ** are deemed as associated. In case of only one file on which the parent number @@ is attached, the file corresponds to a file recorded by the normal dial mode and there is no other associated file. The imaging apparatus initializes in a parent number 0 0 and a chilled number 0 0, if there is no file in the recording medium or memory 9.

Figure 7:
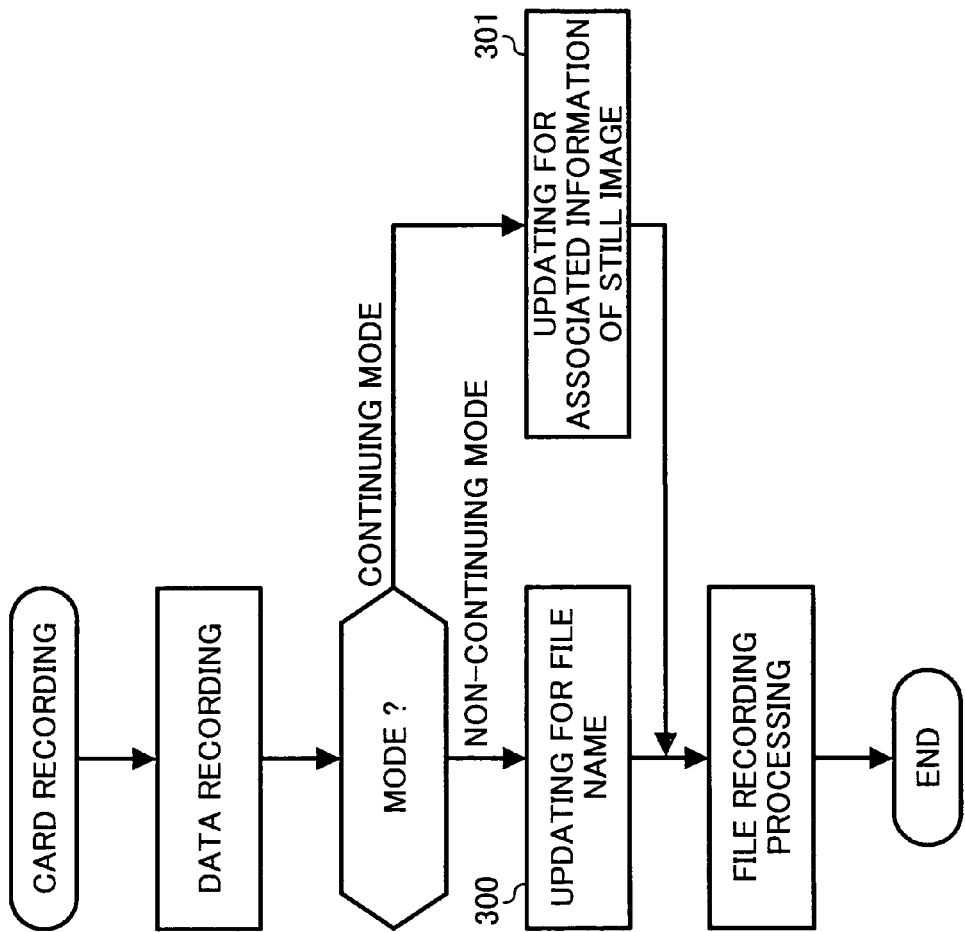
FIG. 7 is a flow chart of a card recording.
Figure 11:
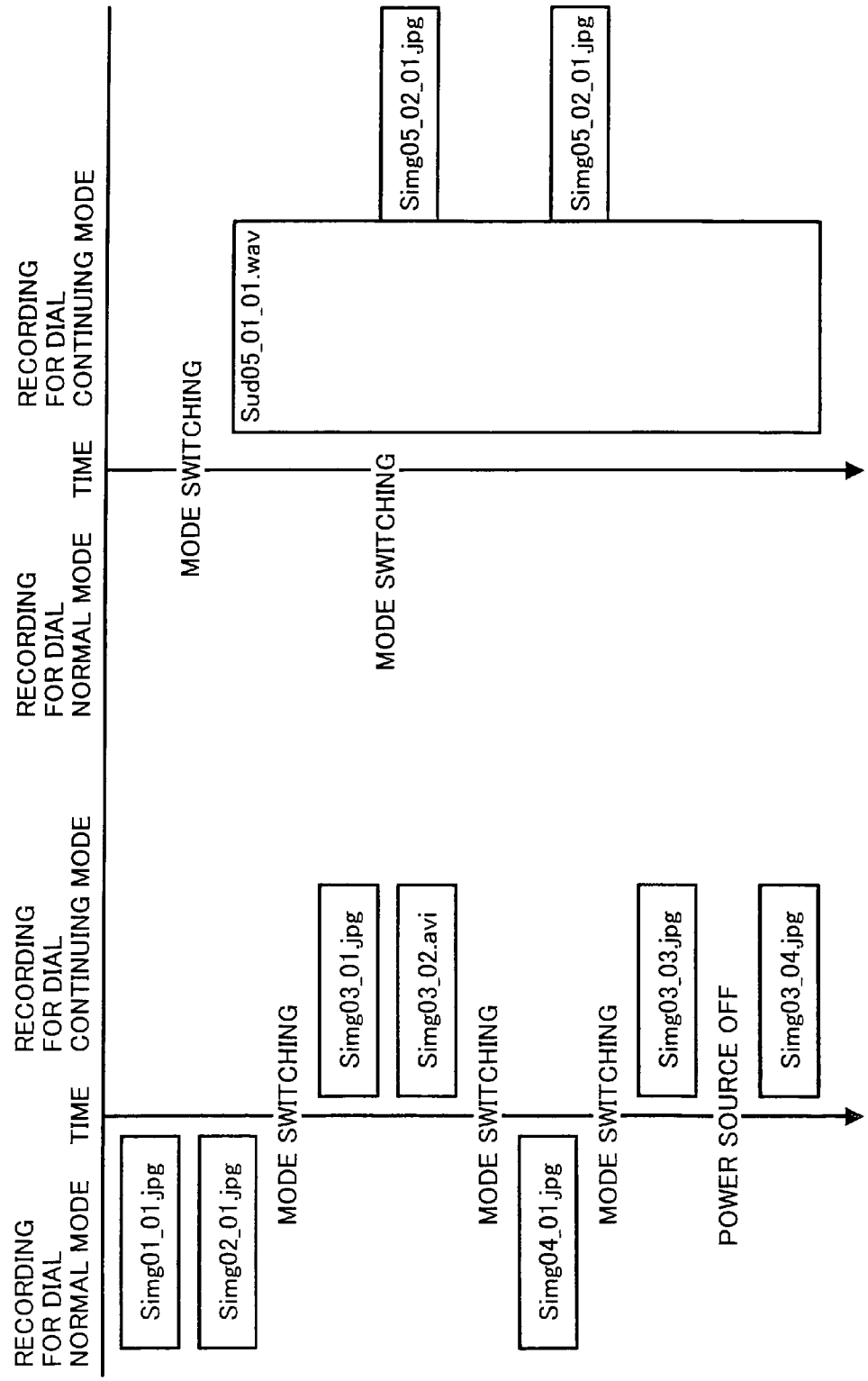
FIG. 11 is an explanatory view of the associated information in response to a shift of the functional modes.

The apparatus is initiated from the parent number 0 0, and the child number 0 1 if there is no file within the recording medium or memory 9 in the normal dial mode, If there is a file within the recording medium or memory 9 in the normal dial mode, the parent number in the recording medium is searched by a process 300 for updating the name of a file, as shown in FIG. 7, and a number in which +1 is added to the maximum value is set as the parent number and the child number is kept to 01. If two still images are photographed in a state in which there is no file within the recording medium or memory 9 in the normal dial mode, two files, simg01_01.jpg and simg02_01.jpg are recorded on the recording medium. FIG. 11 illustrates an explanation of the associated information or file name in response to shift of the functional mode.

Figure 10B:
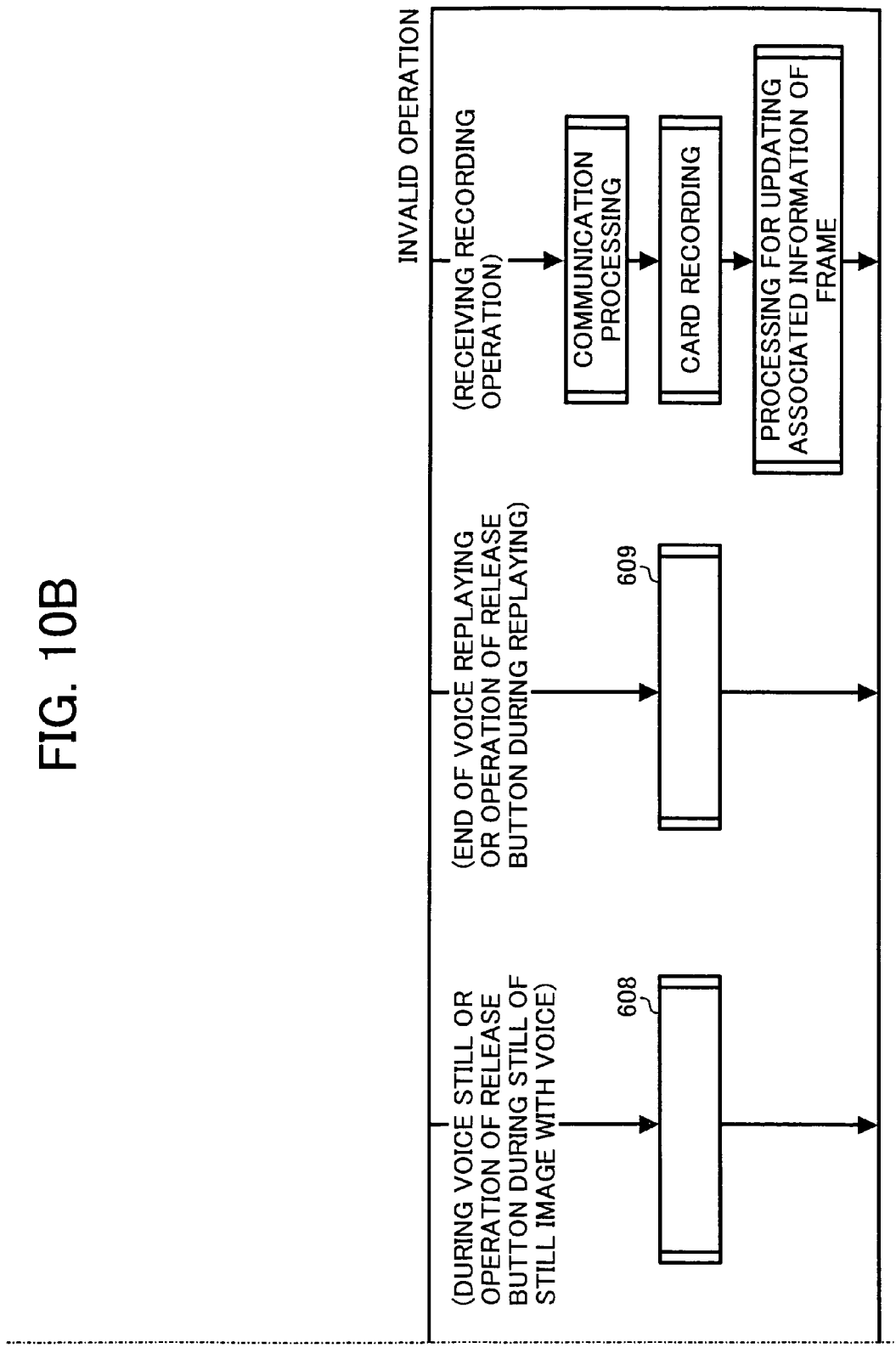
FIG. 10 is a flow chart of a main processing at the time of replaying.

Next, an operation in the continuing dial mode will be explained in connection with FIG. 4. It is judged by what mode the dial is first set (step 101). In case of the normal dial mode, the continuing recording flag is set in zero (0) in the step 102 in FIG. 4 and the recording main processing is carried out in the step 103, as shown in FIG. 5. In case of the replaying mode, the replaying main processing is carried out as shown in FIG. 10 (step 600).

In case of the continuing dial mode, the continuing recording flag is set in 1(one) in the step 104 in FIG. 4, and is shifted to the step 105. A subroutine in a process for a continuing recording menu in the step 105 is shown after a step 400 in FIG. 8.

Figure 8:
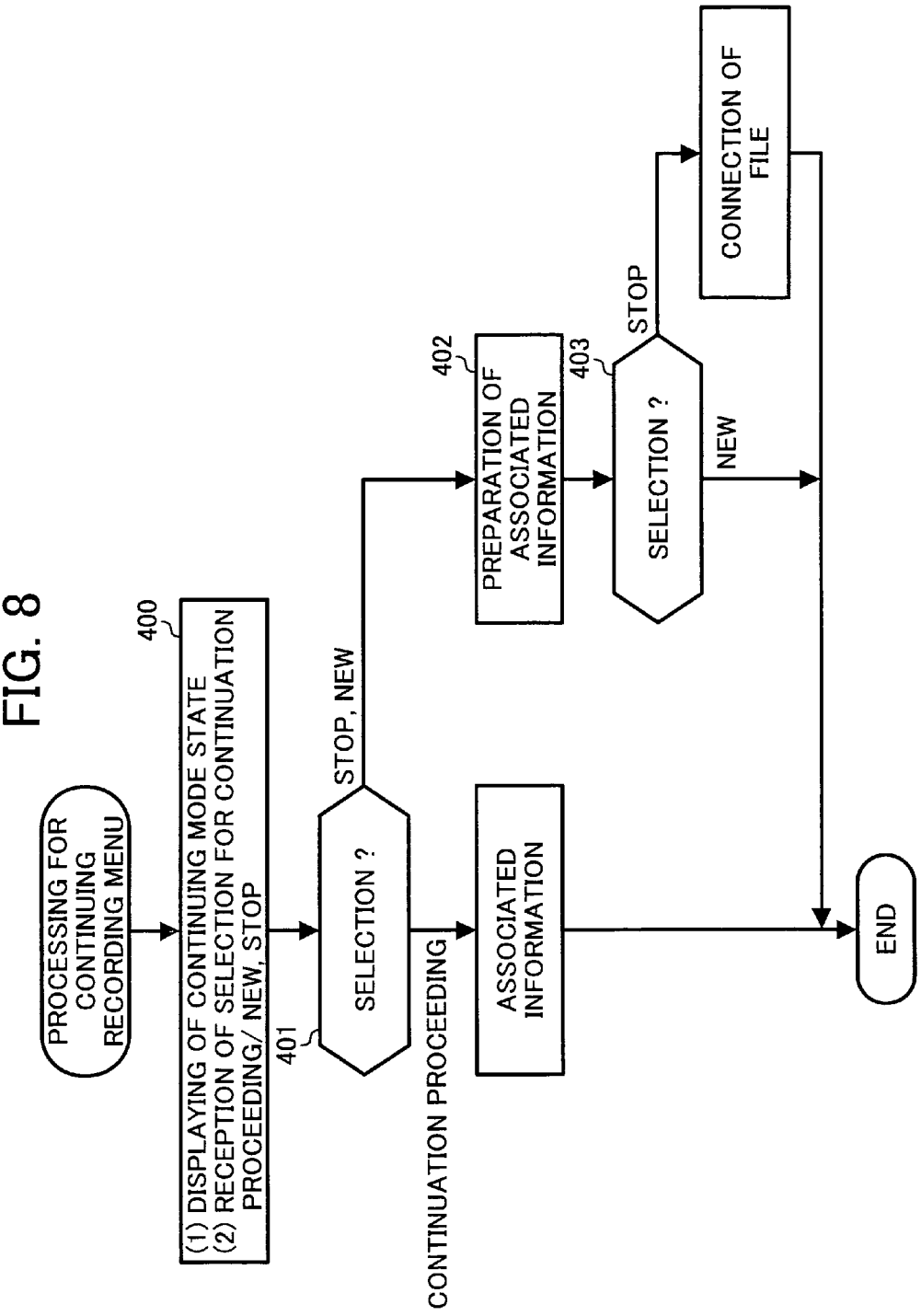
FIG. 8 is a flow chart of a processing for preparing associated information.
Figure 9:
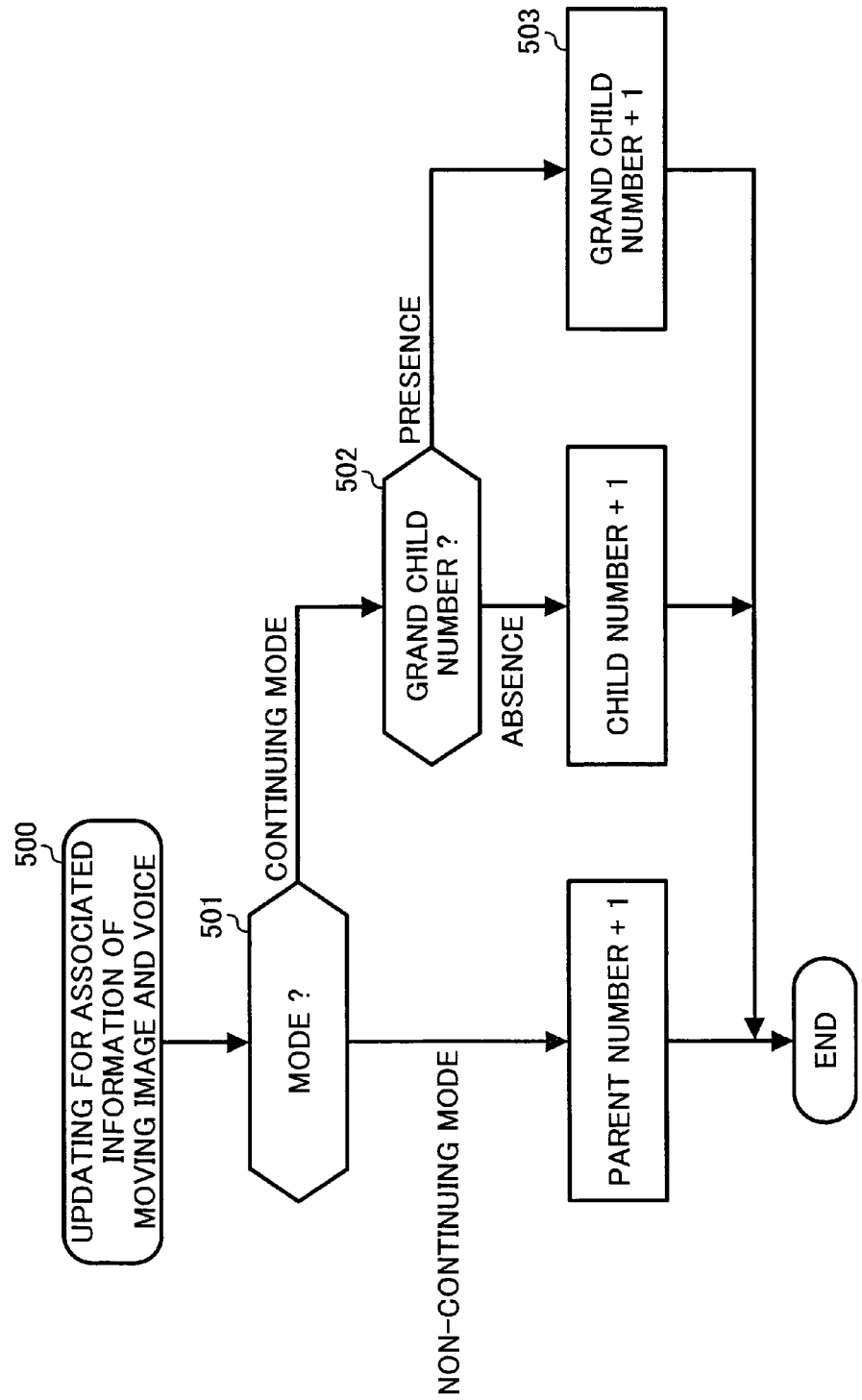
FIG. 9 is a flow chart of processing for updating associated information of a moving image and a voice.

In the continuing recording menu in FIG. 8, the present continuing mode state is shown, the processing allows an operator to select a proceeding of the continuation, a new, or a stop (step 400). Here, if the recording is carried out at first, the new and the stop are selected (step 401), and the associated information is created (step 402).

In the creation of associated information as shown in the step 402 in FIG. 8, the parent number of the file in the recording medium is searched and a value in which +1 (plus one) is added to the maximum value is stored as the associated information. In this case, the child number is 0 0. For example, if the two files, simg01_01.jpg and simg02_01.jpg as described above are in the recording medium, the parent number becomes 0 3.

Moreover, in the step 403 after the associated information is created in the step 402, if the continuing recording is new, the process for the continuing recording menu in the step 105 in the main processing 100 is terminated and the recording main processing 107 shown in FIG. 4 is started. If the continuing recording is stopped in the step 403, the process 105 for the continuing recording menu is terminated by connection of files, and the recording main processing 107 in FIG. 4 is started. A detail of the recording main processing 107 in FIG. 4 is shown in FIG. 5. The recording main processing 103 and the recording main processing 107 are the same. In FIG. 5, if the still image is photographed, after the processing of the steps 208 and 211 is carried out, the card recording processing in the step 212 is executed. A subroutine of the card recording processing in the step 212 is shown in FIG. 7.

In the card recording in FIG. 7, the mode is judged after the data recording processing, in case of the continuing mode, after the update for the associated information of the still image is carried out (step 301), the recording processing of the photographic data is carried out and the subroutine of the card recording processing is terminated to return to the main processing.

In the update for the associated information of the still image in the step 301, a process for adding +1 (plus one) to the child number is performed. Consequently, the still image data of the file name, simg03_01.jpg is recorded on the recording medium such as the memory card 11.

Thereafter, until the mode is switched, the recording main processing 200 in FIG. 5 is looped. In the step 206 in the recording main processing 200, in case of the first SW, the second SW and also in case of the invalid operation in which they are not turned on, the recording main processing in FIG. 6 is looped similarly.

If the dial is switched to the continuing moving image during the loop of the recording main processing 200, the presence of the mode switching is judged in the step 201, the step is returned to the step 101 in the main processing 100 in FIG. 4 without performing the recording main processing 200. Then, in the main processing 100, because of the continuing dial mode by the judgment in the step 101, the continuing recording menu processing 105 in the step 105 is initiated after processing the step 104. The detail of the continuing recording menu processing 105 is shown in FIG. 8 as described above. In the subroutine of the continuing recording menu processing 105, it is displayed that the continuing recording menu processing is continued in the step 400 and the step is shifted to the step 401. In the step 401, when the proceeding is selected, the subroutine of the continuing recording processing 104 is terminated to return to the recording main processing 107 in the main processing in FIG. 4.

Next, the recording main processing 200, which is the subroutine of the continuing recording menu processing 105 is prohibited. In the recording main processing 200, the first SW and the second SW are turned ON continuously, if the moving image is selected in the step 208, after the process for initiating the moving image recording in the step 213 is executed, the updates for the associated information of the moving image and voice in the step 214 are executed. When these are executed, in the above example, the parent number is kept to 0 3, +1 is added to the child number and processed, and the data file name, mimg03_02.avi is recorded in the memory card 11. The subroutine of the recording main processing 200 is looped until the mode switching is carried out.

When the dial is switched to the normal still image (non-continuing mode) in the loop of the subroutine of the recording main processing 200, the step is returned again to the step 101 of the main processing 100 in FIG. 4 without passing the recording main processing 200.

Because of the non-continuing mode herein, the continuing recording flag is cleared (step 102), the recording main processing 103 is initiated. If one still image is photographed, the smig04_01.jpg is recorded on the memory card 11 (recording medium).

Thereafter, if the dial is switched again to the continuing still image mode, the judgment in the step 101 in FIG. 4 is prohibited as described above, after the continuing recording flag is set to 1 (one), the continuing recording menu processing in the step 105 is executed and then the main processing in the step 107 (the subroutine of the recording main processing 200 in FIG. 5) is executed. If the still image is photographed, the card recording processing in the step 212 is carried out.

FIG. 7 illustrates a content of the process of the subroutine of the card recording processing 212. Because the photographed still image is the continuing mode, the update for associated information of the still image in the step 301 is carried out. By the update, the parent number of the file name of the still image data uses "03" held in the associated information, while, +1 is added to the chilled number. Thereby the file name of the still image data becomes simg03_03.jpg, and then it is recorded on the memory card 11 as the still image data.

In the subroutine of the card recording in FIG. 7, in case of the non-continuing mode, after the process for the update of the file name is carried out (step 300), the recording process of the file is carried out and then the subroutine of the card recording processing is terminated to return to recording main processing 200.

Subsequently, a state stopping a power source of a low consumption power in which an operation of photograph and replaying is prohibited will be explained.

That is to say, if the power source SW of the imaging apparatus is turned off, the associated information is stored in a non-volatile memory in the apparatus.

The associated files, simg03_01.jpg, simg03_02.jpg, and mimg03_03.avi may be processed to connect on one file and recorded on the recording medium. In case of OFF of the power source, a power other than the CPU for controlling the apparatus is turned off to prohibit the photograph and the replaying. As a result, because of the low consumption power, the associated information and so on stored in a volatile memory in the apparatus are deleted.

Next, when the power source SW is turned on, the associated information stored in the non-volatile memory is copied on the volatile memory in the apparatus (not shown). For example, in a state that the still image data of the file name, simg03_03.jpg as described above are recorded and the power source is stopped, if the power source is turned on, the parent number 0 3 and the child number 0 3 in the continuing processing are displayed as the continuing processing in the continuing record menu processing in the step 400 in FIG. 8. In the step 401, if the continuing proceeding is selected, the operation as described above is carried out. That is to say, if the continuing still image is photographed, as the parent number, 0 3 held in the associated information is used, and as the child number, because +1 is added to 0 3 held in the associated information, the simg03_04.jpg is recorded on the recording medium.

Next, a function in which a timing information such as a mutual time relationship of the associated and recorded data or individually recorded time is included in the associated information will be explained.

As described above, the child is an order of the recorded timing. If the apparatus has time information, a time at which each of the simg03_01.jpg, simg03_02.jpg, mimg03_03.avi, and simg03_04.jpg is recorded can be recorded in the associated information. When the dial is in the replaying, the associated information is sorted in the order of the child number and can be replayed automatically.

Next, a function capable of selecting the plurality of associated information in the continuing mode will be explained. The associated information is capable to hold associated information in a plurality of groups.

The function as described will be described with reference to FIG. 8 in which the continuing menu processing (step 105) is described in detail.

If a new proceeding is selected in the continuing recording menu, for example 0 5 can be prepared as the parent number in a process 402 for preparing the associated information in FIG. 8. If the menu has an operational function for selecting a new number, for example, 0 3, is selected again as the parent number to enable the menu to add the associated recording.

Subsequently, in the continuing mode, the continuing data for the moving image and voice recordings are recorded. A function capable of recording the still image will be explained below.

Now, it is assumed that the dial is set in the continuing voice mode and a new parent number 0 5 is prepared. At this time, the apparatus secures a ground-child number 0 0 other than the parent number 0 5 and the child number 0 0 as associated information in the preparation of associated information. Thereafter, the recording main processing is executed (step 107). As described above, a detail of the recording main processing 107 is shown in the recording main processing 200 in FIG. 5.

In FIG. 5, when the second SW is turned on (step 206), the step is proceeded to the process for initiating the voice recording (step 219) by the judgment of the operational mode (step 208) to execute the process for initiating the voice recording.

Thereafter, the step proceeds to the updates for the associated information of the moving image and the voice (step 214). In a process 500 of the updates for the associated information of the moving image and the voice in FIG. 9, +1 is added to the ground-child number and the parent, child and ground-child numbers become 0 5, 0 0 and 01, respectively (steps 501,502 and 503).

Thereafter, if the dial is switched to the continuing still image mode, it is judged that the mode is present in the mode switching judgment (step 201) of the dial in FIG. 5. Because it is judged that the previous mode is the voice in the previous mode judgment (step 223), while continuing the recording, the recording main processing in FIG. 5 is terminated to return to the dial mode judgment (step 101) in FIG. 4. In the dial mode judgment, because the dial is the continuing mode, the recording main processing is initiated again (step 107), the recording main processing 200 in FIG. 5 is executed. In the other words, the still image can be recorded by means of the first SW and second SW while recording the voice.

If the still image is recorded (step 211), the recording (step 212), namely, the processing in FIG. 7 is executed. The parent, child, and ground-child numbers 0 5, 0 1 and 0 1 are set in the update processing for the associated information of the still image 301 in FIG. 7 and the simg05_01.jpg is recorded.

Next, if the dial is switched to the continuing voice mode, it is judged that the mode is present in the mode switching judgment (step 201) in FIG. 5 as described above, the recording main processing is terminated, and the dial mode judgment (step 101) in FIG. 4 is proceeded to the continuing dial mode to return to the recording main processing again. The process for terminating the voice recording is executed by the first SW being turned on. At this time, the voice is recorded as sud05_02_01.wav (steps 207,220 and 221).

Next, a function for recording the associated information as memo information in the files will be explained.

In other words, in the embodiments, although the association is carried out with the file name, the information similar to it can be recorded in each file or a combined file.

Subsequently, a replaying main processing in the replaying mode 109 in FIG. 4 will be explained.

FIG. 10 is a flow showing a main processing when replaying.

The main processing 600 when replaying is looped in a stationary state, and decides the SW information operated by the user in the SW (switch) judgment processing 601, and transfers the information to the operation mode judgment processing 603.

The SW judgment processing 601 decides the SW information inputted by the periodical timer interrupting processing every 20 ms. In the operation mode judgment processing 603, the decided SW information is distributed to each processing as a soft ware processing flow, corresponding to the information. If an operation is a frame advance, the frame number to be replayed is decided in a process for deciding the replaying frame number 604 and the decided frame number is displayed with the replaying of the still image. If the frame file is the still image or still image with a voice by a voice memo mode, the image is replayed.

In case of the moving image, an image of the top one frame is replayed and becomes in a still state (step 605). In case of the voice, for example, a screen display of blue color is replayed.

After the completion of the still replaying, the step is returned to the SW judgment processing again, if any effective SW actuation is absent all the operation mode judgment is not carried out to return to the SW judgment processing again.

If the release button is operated during stilling the moving-image, the process 606 for initiating the replaying of the moving image is executed. This means that only by actuating the processing part 30 for replaying the moving image in the parallel processing block in FIG. 2, thereafter, the main processing itself becomes a loop for repeating the SW judgment processing again.

In this way, the main processing part controls merely the initiation and stopping of each processing of the parallel processing blocks and the actual processing is carried out by means of the parallel processing blocks operating with the main processing part. If the release button is turned on during replaying the moving image, the process 607 for stopping the replaying of the moving image is carried out, thereby the processing part 30 for replaying the moving image in the parallel processing blocks is stopped, the frame replayed at that time is displayed into a still state.

Also, with respect to the voice replaying, the initiation and stopping of the voice replaying processing in the parallel processing block are controlled in the main processing (steps 608 and 609), similarly as the above moving image. In case of the still image with a voice by the voice memo mode, if the release button is operated during stilling the still image with the voice, the replaying of the associated voice data are initiated.

Next, a replaying of the moving image will be explained.

First, explaining the process for replaying the moving image in connection with FIG. 1, the CPU 7 reads the moving image and voice data packaged every 1 (one) second from memory card 11 into the memory 9. If the moving image data have, for example, a moving image type of Motion Jpeg of fifteen frames/second, they become fifteen JPEG data. The voice data are voice digital data of one second, if they are, for example, non-compressive data sampling-recorded with 16 bit of 8 KHz cycles, they become continuing data of 16 kbyte.

The DSP part 5 extends the JEPG data of the memory 9 on by one in the same rate to the recording frame rate and stores the extended data in the display memory area in the memory 9. The DSP part 5 sends the voice data of the memory 9 to the voice CODEC 16 in the same rate to recording voice rate and outputs with analog.

Next, explaining about the voice replaying, in the voice replaying processing, the CPU 8 reads in turn the voice data in the memory 9 from the memory card 11. The DSP part 5 sends the voice data in the memory 9 to the voice CODEC 16 in the same rate to the recording voice rate and outputs with analog.

As understood from the above, according to the present invention, the associated condition can be called out at any time by holding the association and therefore the photograph can be carried out without resetting the association each time.

The normal photograph can be carried out during the photograph of the association, because a rapid return can be carried out from the photograph to a setting of the association easily, it is possible to provide a camera for coverage which is very conveniently used by applying the present invention to the camera for coverage.

Even if a power source of an apparatus is turned off, because it is possible to return to the setting of the association easily, the camera for coverage is very useful.

Because a search and an automatic replaying can be carried out by the associated information when replaying, the present invention makes it possible to use to presentation very conveniently.

Because the photograph by the plurality of associations can be carried out and an important still image can be photographed and associated during an audio recording for coverage, if the present invention is applied to the camera for coverage, the camera for coverage can be very conveniently used.

Moreover, if the associated information is in the file, an administration or the like for separate associated data is easy and therefore the apparatus is inexpensive.

What is claimed is:

1. An imaging apparatus, comprising:
    a recording device configured to record data; and
    a replaying device configured to replay the data,
    wherein the recording device includes a continuing mode to associate and record a plurality of data of same kind or different kind in accordance with associated information so that the plurality of data are capable of being replayed in accordance with the associated information; and
    said continuing mode has a function in which the associated information for first data is maintained after the first data is recorded in the continuing mode, and
    if the continuing mode is selected again after second data is recorded in a mode other than the continuing mode in a case where a proceeding of continuation is selected, third data to be newly recorded is associated with the first data, and in a case where a new continuation or stop of continuation is selected, third data to be newly recorded is not associated with the first data and new associated information is created.

2. The imaging apparatus according to claim 1,
    wherein the plurality of data associated in accordance with the associated information are data-processed by at least one mode of a normal still image mode, a normal moving image mode, a normal voice mode, a continuing still image mode, a continuing moving image mode, a continuing voice mode and a replaying mode.

3. The imaging apparatus according to claim 2,
    wherein said associated information is held even though a power source stopping state of a low consumption power in which a photograph and replaying operation are prohibited,
    wherein an associated recording function is carried out pursuant to the associated information when the continuing mode is set again.

4. The imaging apparatus according to claim 2,
    wherein a time information of a mutual time of data associated and recorded or an individual time recorded is included in the associated information.

5. The imaging apparatus according to claim 2,
    wherein a plurality of associated information are selectable in the continuing mode.

6. The imaging apparatus according to claim 2, wherein continuing data for a moving image or voice recording are recorded in the continuing mode and a still image is recorded.

7. The imaging apparatus according to claim 2, wherein each said associated information is recorded as an information within a file.

8. The imaging apparatus according to claim 1, wherein the data are still image data.

9. The imaging apparatus according to claim 8, wherein the data further include moving image data or voice data.

10. The imaging apparatus according to claim 1, wherein the associated information are file names of the data.

* * * * *